(12) United States Patent
Ye et al.

(10) Patent No.: US 11,597,198 B2
(45) Date of Patent: Mar. 7, 2023

(54) METHODS OF MANUFACTURING OPTICALLY ANISOTROPIC POLYMER THIN FILMS

(71) Applicant: META PLATFORMS TECHNOLOGIES, LLC, Menlo Park, CA (US)

(72) Inventors: Sheng Ye, Redmond, WA (US); Andrew John Ouderkirk, Kirkland, WA (US); Arman Boromand, Redmond, WA (US); Liliana Ruiz Diaz, Redmond, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 199 days.

(21) Appl. No.: 17/137,455

(22) Filed: Dec. 30, 2020

(65) Prior Publication Data
US 2022/0105719 A1    Apr. 7, 2022

Related U.S. Application Data

(60) Provisional application No. 63/087,538, filed on Oct. 5, 2020.

(51) Int. Cl.
| | |
|---|---|
| B32B 38/00 | (2006.01) |
| B32B 27/08 | (2006.01) |
| B32B 27/36 | (2006.01) |
| B32B 7/022 | (2019.01) |

(Continued)

(52) U.S. Cl.
CPC ......... *B32B 38/0012* (2013.01); *B32B 7/022* (2019.01); *B32B 7/023* (2019.01);
(Continued)

(58) Field of Classification Search
CPC ............ B32B 2551/00; B32B 2367/00; B32B 2309/105; B32B 2307/42;
(Continued)

(56) References Cited

U.S. PATENT DOCUMENTS

| | | |
|---|---|---|
| 5,939,845 A | 8/1999 | Hommes |
| 6,096,375 A | 8/2000 | Ouderkirk et al. |
| | (Continued) | |

FOREIGN PATENT DOCUMENTS

| | | |
|---|---|---|
| FR | 2 924 048 A1 | 5/2009 |
| JP | 2019101075 A | 6/2019 |
| | (Continued) | |

OTHER PUBLICATIONS

Machine translation of WO 2016/104353 A1; Inventor: Atsushi Muraoka; Publication date: Jun. 30, 2016.*

(Continued)

*Primary Examiner* — Vishal I Patel
(74) *Attorney, Agent, or Firm* — Greenberg Traurig, LLP

(57) ABSTRACT

A method of manufacturing an optically anisotropic polymer thin film includes forming a composite structure that includes a polymer thin film and a high Poisson's ratio polymer thin film disposed directly over the polymer thin film, attaching a clip array to opposing edges of the composite, the clip array including a plurality of first clips slidably disposed on a first track located proximate to a first edge of the composite and a plurality of second clips slidably disposed on a second track located proximate to a second edge of the composite, applying a positive in-plane strain to the composite along a transverse direction by increasing a distance between the first clips and the second clips, and decreasing an inter-clip spacing amongst the first clips and amongst the second clips along a machine direction, wherein the high Poisson's ratio polymer thin film applies a negative in-plane strain to the polymer thin film along the machine.

17 Claims, 7 Drawing Sheets

(51) Int. Cl.
 *B32B 37/20* (2006.01)
 *B32B 7/023* (2019.01)
 *B32B 43/00* (2006.01)

(52) U.S. Cl.
 CPC .............. *B32B 27/08* (2013.01); *B32B 27/36* (2013.01); *B32B 37/203* (2013.01); *B32B 38/0036* (2013.01); *B32B 43/006* (2013.01); *B32B 2038/0028* (2013.01); *B32B 2250/244* (2013.01); *B32B 2307/42* (2013.01); *B32B 2309/105* (2013.01); *B32B 2367/00* (2013.01); *B32B 2551/00* (2013.01)

(58) Field of Classification Search
 CPC ...... B32B 2250/244; B32B 2038/0028; B32B 43/006; B32B 38/0036; B32B 37/203; B32B 27/36; B32B 27/08; B32B 7/023; B32B 7/022; B32B 38/0012
 See application file for complete search history.

(56) References Cited

U.S. PATENT DOCUMENTS

| | | | |
|---|---|---|---|
| 6,827,886 | B2 | 12/2004 | Neavin et al. |
| 9,314,961 | B2 | 4/2016 | Merrill et al. |
| 10,350,818 | B2 * | 7/2019 | Merrill .................. B29C 55/06 |
| 2006/0226562 | A1 | 10/2006 | Johnson et al. |
| 2018/0290370 | A1 | 10/2018 | Trivero |
| 2019/0184626 | A1 | 6/2019 | Darlet |

FOREIGN PATENT DOCUMENTS

| | | |
|---|---|---|
| WO | 2013133266 A1 | 9/2013 |
| WO | 2016104353 A1 | 6/2016 |
| WO | 2016114004 A1 | 7/2016 |
| WO | 2016114005 A1 | 7/2016 |

OTHER PUBLICATIONS

Invitation to Pay Additional Fees for International Application No. PCT/US2021/053495, dated Jan. 28, 2022, 11 Pages.

International Search Report and Written Opinion for International Application No. PCT/US2021/053495 dated Mar. 25, 2022, 16 pages.

International Search Report and Written Opinion for International Application No. PCT/US2021/045024, dated Jan. 7, 2022, 8 pages.

International Search Report and Written Opinion for International Application No. PCT/US2021/053270, dated Jan. 24, 2022, 9 pages.

* cited by examiner

A

B

METHODS OF MANUFACTURING OPTICALLY ANISOTROPIC POLYMER THIN FILMS

CROSS-REFERENCE TO RELATED APPLICATION

This application claims the benefit of priority under 35 U.S.C. § 119(e) of U.S. Provisional Application No. 63/087,538, filed Oct. 5, 2020, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
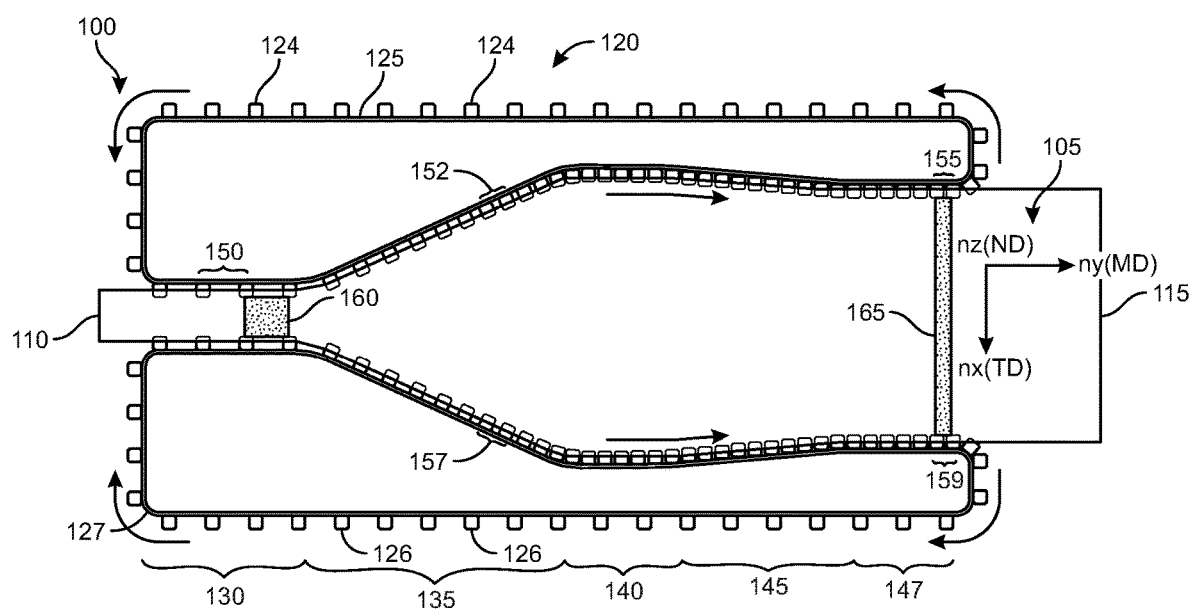
FIG. 1 is a schematic view of a single-stage thin film orientation system for manufacturing an optically anisotropic polymer thin film according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer thin films exhibiting optical anisotropy may be incorporated into a variety of systems and devices, including birefringent gratings, reflective polarizers, optical compensators and optical retarders for systems using polarized light such as liquid crystal displays (LCDs). Birefringent gratings may be used as optical combiners in augmented reality displays, for example, and as input and output couplers for waveguides and fiber optic systems. Reflective polarizers may be used in many display-related applications, particularly in pancake optical systems and for brightness enhancement within display systems that use polarized light. For orthogonally polarized light, pancake lenses may use reflective polarizers with extremely high contrast ratios for transmitted light, reflected light, or both transmitted and reflected light.

The degree of optical anisotropy achievable through conventional thin film manufacturing processes is typically limited, however, and is often exchanged for competing thin film properties such as flatness, toughness and/or film strength. For example, highly anisotropic polymer thin films often exhibit low strength in one or more in-plane direction, which may challenge manufacturability and limit throughput. Notwithstanding recent developments, it would be advantageous to provide mechanically robust, optically anisotropic polymer thin films that may be incorporated into various optical systems including display systems for artificial reality applications. The instant disclosure is thus directed generally to optically anisotropic polymer thin films and their methods of manufacture, and more specifically to systems for applying a tensile stress to a polymer thin film along a first direction while applying a compressive stress along a direction substantially orthogonal to the first direction, i.e., a second direction, to induce a desired in-plane optical anisotropy through the reorientation of crystals within the polymer thin film.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

Many applications utilize light that propagates along or substantially along a direction normal to the major surface of a polymer thin film, i.e., along the z-axis. Insomuch as the optical efficiency of the polymer thin film may be determined principally by the in-plane birefringence, it may be beneficial to configure the polymer thin film such that $n_x \gg n_y$, where $n_x$ and $n_y$ are mutually orthogonal in-plane refractive indices of the polymer thin film. In this regard, it will be appreciated that comparative, uniaxially-oriented polymer thin films may be characterized by $n_x > n_y \geq n_z$, where the in-plane birefringence (i.e., $n_x - n_y$) is typically limited to values less than 0.15, e.g., 0.01, 0.05, or 0.1.

The refractive index of a crystalline polymer thin film may be determined by its chemical composition, the chemical structure of the polymer repeat unit, its density and extent of crystallinity, as well as the alignment of the crystals and/or polymer chains. Among these factors, the crystal alignment may dominate. In crystalline or semi-crystalline optical polymer thin films, the optical anisotropy may be correlated to the degree or extent of crystal orientation, whereas the degree or extent of chain entanglement may create comparable optical anisotropy in amorphous polymer thin films.

An applied stress may be used to create a preferred alignment of crystals within a polymer thin film and induce a corresponding modification of the refractive index along different directions of the film. As disclosed further herein, during processing where a polymer thin film is stretched along one in-plane direction, Applicants have shown that an optically anisotropic material may be formed by simultaneously applying an in-plane compressive stress along a direction orthogonal or substantially orthogonal to the tensile direction. In some embodiments, a polymer thin film may be formed into a composite that further includes a high Poisson's ratio polymer thin film where a thin film orientation system may be used to apply the in-plane tensile stress and the attendant deformation of the high Poisson's ratio polymer thin film may induce the in-plane compressive stress. The high Poisson's ratio polymer thin film may be a sacrificial layer that is used in conjunction with a thin film orientation system to stretch a polymer thin film and form an optically anisotropic polymer thin film therefrom.

According to certain embodiments, a high Poisson's ratio polymer thin film may be used to manipulate the stress state and accordingly induce optical anisotropy in an optical quality polymer thin film. That is, a polymer thin film having a high-Poisson's ratio may be laminated to an optical quality polymer thin film to form a composite polymer thin film, and the composite polymer thin film may be stretched along a first in-plane direction such that, due to the associated contraction of the high-Poisson's ratio thin film along a second in-plane direction orthogonal to the first in-plane direction, the optical quality polymer thin film may be stretched along the first direction and compressed along the second direction. The biaxial stress state applied to the optical quality polymer thin film may induce a reorientation of crystals within the optical quality polymer thin film and an attendant realization of anomalous birefringence therein. The optical quality polymer thin film may then be separated from the high-Poisson's ratio polymer thin film.

In some embodiments, the optical quality polymer thin film may be a crystalline thin film, where the applied stress may reorient indigenous crystals to generate an optical quality polymer thin film having $n_x > n_z \geq n_y$, where $n_x$ and $n_y$ are mutually orthogonal in-plane refractive indices. In some embodiments, the optical quality polymer thin film may be a crystallizable polymer thin film where crystals within the optical quality polymer thin film may be formed during the act of stretching and such nascent crystals may be reoriented to generate an optical quality polymer thin film where $n_x > n_z \geq n_y$.

In some embodiments, the optical quality polymer thin film may include a single polymer layer. A single layer optical quality polymer thin film may be initially optically isotropic ($n_x = n_y = n_z$) or anisotropic ($n_x > n_y > n_z$) prior to stretching. In further embodiments, an optical quality polymer thin film may be incorporated into a multilayer structure, such as the "A" layer in an ABABAB multilayer. Prior to stretching, each A layer may be optically isotropic ($n_x = n_y = n_z$) or anisotropic ($n_x > n_y > n_z$). Following stretching, each A layer may be characterized by anomalous birefringence, i.e., $n_x > n_z \geq n_y$, whereas each B layer may remain optically isotropic.

In accordance with particular embodiments, Applicants have developed a polymer thin film manufacturing method for forming a birefringent polymer thin film characterized by in-plane refractive indices ($n_x$ and $n_y$) and a through-thickness refractive index ($n_z$), where $n_x > n_z > n_y$. In some embodiments, the difference in in-plane refractive indices (i.e., $n_x - n_y$) may be greater than 0.15, and the high in-plane refractive index (i.e., $n_x$) may be greater than approximately 1.8. In particular embodiments, the difference in in-plane refractive indices (i.e., $n_x - n_y$) measured at 550 nm may be greater than 0.15, and the high in-plane refractive index (i.e., $n_x$) measured at 550 nm may be greater than approximately 1.8.

The formation of optically anisotropic polymer thin films may leverage a high Poisson's ratio thin film. As used herein, a polymer thin film having a "high Poisson's ratio" may, in certain examples, refer to a polymer thin film having a Poisson's ratio of greater than approximately 0.5, e.g., approximately 0.6, approximately 0.65, approximately 0.7, approximately 0.75, approximately 0.8, approximately 0.85, or approximately 0.9, including ranges between any of the foregoing values. The Poisson's ratio may describe the anisotropic properties of a material, including optical properties such as birefringence. The Poisson's ratio (v) is defined as the ratio of the change in the width per unit width of a material to the change in its length per unit length as a result of an applied stress. With tensile deformations considered positive and compressive deformations considered negative, the Poisson's ratio may be expressed as $v = -\varepsilon_t/\varepsilon_n$, where $\varepsilon_t$ is transverse strain and $\varepsilon_n$ is longitudinal strain.

The Poisson's ratio of a polymer thin film is largely dictated by the film-forming process. For isotropic, elastic materials, the Poisson's ratio is thermodynamically constrained to the range $-1 \geq v \geq 0.5$. Moreover, most polymers exhibit a Poisson's ratio within a range of approximately 0.2 to approximately 0.3. As disclosed herein, optically anisotropic polymer thin films may be characterized by a Poisson's ratio greater than 0.5, which may enable improved performance for gratings, retarders, compensators, reflective polarizers, etc. that incorporate such thin films.

The presently disclosed optically anisotropic polymer thin films may be characterized as optical quality polymer thin films and may form, or be incorporated into, an optical element such as a birefringent grating, optical retarder, optical compensator, reflective polarizer, etc. Such optical elements may be used in various display devices, such as virtual reality (VR) and augmented reality (AR) glasses and headsets. The efficiency of these and other optical elements may depend on the degree of in-plane birefringence.

According to various embodiments, an "optical quality polymer thin film" or an "optical thin film" and the like may, in some examples, be characterized by a transmissivity within the visible light spectrum of at least approximately 20%, e.g., 20, 30, 40, 50, 60, 70, 80, 90 or 95%, including ranges between any of the foregoing values, and less than approximately 10% bulk haze, e.g., 0, 1, 2, 4, 6, or 8% bulk haze, including ranges between any of the foregoing values.

In accordance with various embodiments, a reflective polarizer may include a multilayer architecture of alternating (i.e., primary and secondary) polymer layers. In certain aspects, the primary and secondary polymer layers may be configured to have (a) refractive indices along a first in-plane direction (e.g., along the x-axis) that differ sufficiently to substantially reflect light of a first polarization state, and (b) refractive indices along a second in-plane direction (e.g., along the y-axis) orthogonal to the first in-plane direction that are matched sufficiently to substantially transmit light of a second polarization state. That is, a reflective polarizer may reflect light of a first polarization state and transmit light of a second polarization state orthogonal to the first polarization state. As used herein, "orthogonal" states may, in some examples, refer to complementary states that may or may not be related by a 90° geometry. For instance, "orthogonal" directions used to describe the length, width, and thickness dimensions of a polymer thin film may or may not be precisely orthogonal as a result of non-uniformities in the thin film.

In a multilayer structure, one or more of the polymer layers, i.e., one or more primary polymer layers and/or one or more secondary polymer layers, may be characterized by a directionally-dependent refractive index. By way of example, a primary polymer layer (or a secondary polymer layer) may have a first in-plane refractive index ($n_x$), a second in-plane refractive index ($n_y$) orthogonal to and less than the first in-plane refractive index, and a third refractive index ($n_z$) along a direction orthogonal to a major surface of the primary (or secondary) polymer layer (i.e., orthogonal to both the first in-plane refractive index and the second in-plane refractive index), where the third refractive index is less than the first refractive index and greater than or equal to the second refractive index, i.e., $n_x > n_z \geq n_y$. One or more of the polymer layers, i.e., one or more primary polymer layers and/or one or more secondary polymer layers, may be characterized as an optical quality polymer thin film.

In a multilayer architecture of alternating polymer layers, each primary polymer layer and each secondary polymer layer may independently have a thickness ranging from approximately 10 nm to approximately 200 nm, e.g., 10, 20, 50, 100, 150, or 200 nm, including ranges between any of the foregoing values. A total multilayer stack thickness may range from approximately 1 micrometer to approximately 400 micrometers, e.g., 1, 2, 5, 10, 20, 50, 100, 200, 300 or 400 micrometers, including ranges between any of the foregoing values.

According to some embodiments, the areal dimensions (i.e., length and width) of an optically anisotropic polymer thin film may independently range from approximately 5 cm to approximately 50 cm or more, e.g., 5, 10, 20, 30, 40, or 50 cm, including ranges between any of the foregoing values. Example optically anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

In some embodiments, a multilayer structure may be characterized by a progressive change in the thickness of each individual primary and secondary polymer layer and/or each primary and secondary polymer layer pair. That is, a multilayer architecture may be characterized by an internal thickness gradient where the thickness of individual primary and secondary polymer layers within each successive pair changes continuously throughout the stack.

In various aspects, and by way of example, a multilayer stack may include a first pair of primary and secondary polymer layers each having a first thickness, a second pair of primary and secondary polymer layers adjacent to the first pair each having a second thickness that is less than the first thickness, a third pair of primary and secondary polymer layers adjacent to the second pair each having a third thickness that is less than the second thickness, etc. According to certain embodiments, a thickness step for such a multilayer stack suitable for forming a reflective polarizer may be approximately 1 nm to approximately 30 nm, e.g., 2, 5, 10, 20 or 30 nm, including ranges between any of the foregoing values. By way of example, a multilayer stack having a thickness gradient with a 10 nm thickness step may include a first pair of primary and secondary polymer layers each having a thickness of approximately 85 nm, a second pair of primary and secondary polymer layers adjacent to the first pair each having a thickness of approximately 75 nm, a third pair of primary and secondary polymer layers adjacent to the second pair each having a thickness of approximately 65 nm, a fourth pair of primary and secondary polymer layers adjacent to the third pair each having a thickness of approximately 55 nm, and so on.

According to further embodiments, a multilayer stack may include alternating primary and secondary polymer layers where the thickness of each individual layer changes continuously throughout the stack. For instance, a multilayer stack may include a first pair of primary and secondary polymer layers, a second pair of primary and secondary polymer layers adjacent to the first pair, a third pair of primary and secondary polymer layers adjacent to the second pair, etc., where the thickness of the first primary layer is greater than the thickness of the first secondary layer, the thickness of the first secondary layer is greater than the thickness of the second primary layer, the thickness of the second primary layer is greater than the thickness of the second secondary layer, the thickness of the second secondary layer is greater than the thickness of the third primary layer, the thickness of the third primary layer is greater than the thickness of the third secondary layer, and so on.

In certain embodiments, a multilayer structure may include a stack of alternating primary polymer layers and secondary polymer layers where the primary polymer layers may exhibit a higher degree of in-plane optical anisotropy than the secondary polymer layers. For instance, the primary polymer layers may have in-plane refractive indices that differ by at least 0.15 whereas the secondary polymer layers may have in-plane refractive indices that differ by less than 0.15. In such embodiments, by way of example, the primary (more optically anisotropic) polymer layers may include polyethylene naphthalate (PEN), polyethylene terephthalate (PET), or polyethylene isophthalate, and the secondary (less optically anisotropic) polymer layers may include a co-polymer of any two of the foregoing, e.g., a PEN-PET co-polymer, although further compositions are contemplated for the primary polymer layers and the secondary polymer layers.

By way of example, a pancake optical system, such as a pancake lens, may include an optical element having a reflective surface and a reflective polarizer. A pancake lens may be either transmissive or reflective. According to some embodiments, a transmissive system may include a partially transparent mirrored surface and a reflective polarizer configured to reflect one handedness of circularly polarized light and transmit the other handedness of the circularly polarized light. A reflective system, on the other hand, may include a reflective polarizer configured to transmit one polarization of light, a reflector, and a quarter wave plate for converting linearly polarized light to circularly polarized light. Thus, the reflective polarizer may be a circularly polarized element such as, for example, a cholesteric reflective polarizer, or a linearly polarized element that is adapted for use with a quarter wave plate.

In accordance with various embodiments, an optically anisotropic polymer thin film may be formed by applying a desired stress state to a polymer thin film. A crystalline polymer composition or a polymer composition capable of crystallizing may be formed into a single layer using appropriate extrusion and casting operations well known to those skilled in the art. For example, PEN may be extruded and oriented as a single layer to form an optically and mechanically anisotropic film. According to further embodiments, a polymer may be coextruded with other polymer materials that are either crystalline, crystallizable, or that remain amorphous after orientation to form a multilayer structure. In a further example, PEN may be coextruded with copolymers of terephthalic and isophthalic acid mixtures polymerized with ethylene glycol. In a still further example, one or more crystalline or crystallizable PEN layers may be laminated to a polymer layer having a high-Poisson's ratio to form a composite polymer thin film.

In single layer and multilayer examples, the thickness of each respective polymer layer may independently range from approximately 5 nm to approximately 1 mm or more for a range of mechanical and optical applications, e.g., 5, 10, 20, 50, 100, 200, 500, or 1000 nm, including ranges between any of the foregoing values. As used herein, the terms "polymer thin film" and "polymer layer" may be used interchangeably. Furthermore, reference to a "polymer thin film" or a "polymer layer" may include reference to a "multilayer polymer thin film" and the like, unless the context clearly indicates otherwise.

Example polymers may include one or more of polyethylene naphthalate, polyethylene terephthalate, polyethylene isophthalate, polybutylene terephthalate, polyoxymethylene, aliphatic or semi-aromatic polyamides, ethylene vinyl alcohol, polyvinylidene fluoride, isotactic polypropylene, polyethylene, and the like, as well as combinations, including isomers and co-polymers thereof. Further example polymers may be derived from phthalic acid, azelaic acid, norbornene dicarboxylic acid and other dicarboxylic acids. Suitable carboxylates may be polymerized with glycols including ethylene glycol, propylene glycol, and other glycols and di-hydrogenated organic compounds.

In some embodiments, the crystalline content may include polyethylene naphthalate or polyethylene terephthalate, for example, although further crystalline polymer materials are contemplated, where a crystalline phase in a "crystalline" or "semi-crystalline" polymer thin film may, in some examples, constitute at least approximately 1 vol. % of the polymer thin film. These and other polymers may be used to form a polymer thin film and a high Poisson's ratio polymer thin film. A high Poisson's ratio polymer thin film may be amorphous or crystalline.

An optically anisotropic polymer thin film may be formed using a thin film orientation system configured to heat and stretch a polymer thin film composite (e.g., a polymer laminate) in at least one in-plane direction in one or more distinct regions thereof. A polymer thin film composite may include a polymer thin film and a high Poisson's ratio polymer thin film disposed directly over the polymer thin film. In some embodiments, the crystalline content of the polymer thin film may increase during the act of stretching. In some embodiments, stretching may alter the orientation of crystals within a polymer thin film without substantially changing the crystalline content.

In some embodiments, a thin film orientation system may be configured to apply a tensile stress to the polymer thin film composite along only one in-plane direction while an in situ compressive force is applied to the polymer thin film along a second in-plane direction orthogonal to the first in-plane direction. For instance, a thin film orientation system may be configured to apply an in-plane tensile stress to the polymer thin film composite along a transverse direction (e.g., the x-direction) and allow the polymer thin film to relax along a machine direction while the high Poisson's ratio polymer thin film applies an in-plane compressive stress to the polymer thin film along the machine direction (e.g., along the y-direction).

The high Poisson's ratio polymer thin film may be configured to provide a desired compressive stress along a direction orthogonal or substantially orthogonal to the applied tensile stress. As such, one or more of the composition, thickness, orientation, etc. of the high Poisson's ratio polymer thin film may be controlled. For instance, the in-plane Poisson's ratio of the high Poisson's ratio polymer thin film may be isotropic such that the realized compressive stress is independent of the orientation of the high Poisson's ratio polymer thin film with respect to the polymer thin film. On the other hand, in examples where the in-plane Poisson's ratio of the high Poisson's ratio polymer thin film is anisotropic, the orientation of the high Poisson's ratio polymer thin film with respect to the polymer thin film may be arranged to provide a desired in-plane compressive stress. In some embodiments, the orientation of an anisotropic high Poisson's ratio polymer thin film with respect to a polymer thin film may be configured to provide a maximum in-plane deformation (compressive stress) in response to a given tensile stress.

According to some embodiments, within an example system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In response to an in-plane tensile stress along the transverse direction, a high Poisson's ratio polymer thin film may induce an in-plane compressive stress effective to manipulate the orientation of crystals within the polymer thin film. In some embodiments, stretching along the transverse direction and relaxation/compression along the machine direction may occur simultaneously and may be independently and locally controlled. In certain embodiments, large scale production may be enabled, for example, using a roll-to-roll manufacturing platform.

In some embodiments, as will be described in further detail herein, an inter-clip spacing along either or both tracks may vary as a function of location within the thin film orientation system. For instance, an inter-clip spacing along either track may independently increase (or decrease) as the clips move and guide the polymer thin film from an input zone of the system to an output zone of the system. Such a configuration may effectively increase (or decrease) the translation rate of the polymer thin film along the machine direction during application of the transverse tensile stress.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline polymer thin film may be heated to a temperature greater than its glass transition temperature ($T_g$), e.g., $T_g+10°$ C., $T_g+20°$ C., $T_g+30°$ C., $T_g+40°$ C., $T_g+50°$ C., $T_g+60°$ C., $T_g+70°$ C., $T_g+80°$ C., $T_g+90°$ C. or $T_g+100°$ C., including ranges between any of the foregoing values, to facilitate deformation of the thin film and the formation and realignment of crystals therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, a region of the polymer thin film may be temporally heated to different temperatures, i.e., during and subsequent to the application of the tensile stress. In some embodiments, different regions of the polymer thin film may be heated to different temperatures. In certain embodiments, a strain realized in response to the applied tensile stress may be at least approximately 20%, e.g., approximately 20%, approximately 50%, approximately 100%, approximately 150%, approximately 200%, approximately 300%, approximately 400%, or approximately 500% or more, including ranges between any of the foregoing values.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film.

According to certain embodiments, the application of a bi-axial stress (e.g., a tensile stress along a transverse direction and a compressive stress along a machine direction) may induce a reorientation of crystals within the polymer thin film (e.g., optical quality polymer thin film). Following deformation and crystal realignment, the crystals may be at least partially aligned with the direction of the applied tensile stress and oriented out of the plane of the polymer thin film to form an optically anisotropic layer, where $n_x > n_z \geq n_y$, (i.e., $n_x > n_z = n_y$, and/or $n_x > n_z > n_y$). In some embodiments, the in-plane birefringence ($n_x - n_y$) may be greater than approximately 0.15, where $n_x$ may be greater than approximately 1.8, e.g., approximately 1.81, approximately 1.83, approximately 1.85, approximately 1.87, approximately 1.89, or more.

In accordance with various embodiments, optically anisotropic polymer thin films may include fibrous, amorphous, partially crystalline, or wholly crystalline materials. Such materials may also be mechanically anisotropic, where one or more characteristics including but not limited to compressive strength, tensile strength, shear strength, yield strength, stiffness, hardness, toughness, ductility, machinability, thermal expansion, flatness, and creep behavior may be directionally dependent.

The optically anisotropic polymer thin films disclosed herein may be used to form multilayer reflective polarizers that may be implemented in a variety of applications. For instance, a multilayer reflective polarizer may be used to increase the polarized light output by an LED- or OLED-based display grid that includes an emitting array of monochromatic, colored, or IR pixels. In some embodiments, a reflective polarizer thin film may be applied to an emissive pixel array to provide light recycling and increased output for one or more polarization states. Moreover, highly optically anisotropic polymer thin films may decrease pixel blur in such applications.

An example reflective polarizer may be characterized as a multilayer structure having between approximately 2 and approximately 1000 layers of alternating first and second polymers, e.g., 2, 10, 20, 50, 100, 250, 500, 1000 layers, or more, including ranges between any of the foregoing values. The first polymer may form an optically birefringent polymer thin film. Layers of the first polymer may exhibit a difference between a high in-plane refractive index and a low in-plane refractive index each measured at 550 nm of at least approximately 0.15, and a difference between an out of plane refractive index and the low in-plane refractive index each measured at 550 nm of less than approximately 0.1, e.g., less than approximately 0.05, or even less than approximately 0.025. The second polymer may form an optically isotropic polymer thin film.

A reflective polarizer including an optically anisotropic polymer thin film may be thermally stable and have a reflectivity of less than approximately 10%, e.g., less than approximately 5%, less than approximately 2%, or less than approximately 1%, for linearly p-polarized light incident at a 45° angle and oriented along the pass axis of the reflective polarizer. The reflective polarizer may exhibit less than approximately 5% strain (e.g., less than approximately 5% shrinkage, less than approximately 2% shrinkage, less than approximately 1% shrinkage, or less than approximately 0.5% shrinkage) when heated at approximately 95° C. for at least 40 minutes.

Aspects of the present disclosure thus relate to the formation of a multilayer reflective polarizer having improved mechanical and optical properties and including one or more optically anisotropic polymer thin films. The improved mechanical properties may include improved dimensional stability and improved compliance in conforming to a compound curved surface. The improved optical properties may include a higher contrast ratio and reduced polarization angle variance when conformed to a compound curved surface.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-7, detailed descriptions of methods and systems for manufacturing optically anisotropic polymer thin films. The discussion associated with FIGS. 1-5 relates to example thin film processing systems and methods. The discussion associated with FIGS. 6 and 7 relates to exemplary virtual reality and augmented reality devices that may include one or more optically anisotropic polymer thin films as disclosed herein.

In conjunction with various embodiments, a polymer thin film may be described with reference to three mutually orthogonal axes that are aligned with the machine direction (MD), the transverse direction (TD), and the normal direction (ND) of a thin film orientation system, and which may correspond respectively to the length, width, and thickness dimensions of the polymer thin film. Throughout various embodiments and examples of the instant disclosure, the machine direction may correspond to the y-direction of a polymer thin film, the transverse direction may correspond to the x-direction of the polymer thin film, and the normal direction may correspond to the z-direction of the polymer thin film.

In accordance with various embodiments, a polymer thin film (e.g., optical quality polymer thin film) may be characterized as a "crystalline" polymer thin film, i.e., having at least approximately 1% crystalline content. As will be appreciated, during the processing of such a polymer thin film, the crystalline content may be manipulated to achieve a desired optical anisotropy. In accordance with further embodiments, a polymer thin film (e.g., optical quality polymer thin film) may be characterized as a "crystallizable" polymer thin film. Such a polymer thin film may be initially crystalline or amorphous. During processing of a crystallizable polymer thin film, a crystalline content may increase, and the pre-existing and/or nascent crystals may be manipulated to achieve a desired optical anisotropy.

A single stage thin film orientation system for forming an optically anisotropic polymer thin film is shown schematically in FIG. 1. System 100 may include a thin film input zone 130 for receiving and pre-heating a crystallizable portion 110 of a polymer thin film 105, a thin film output zone 147 for outputting a crystallized and oriented portion 115 of the polymer thin film 105, and a clip array 120 extending between the input zone 130 and the output zone 147 that is configured to grip and guide the polymer thin film 105 through the system 100, i.e., from the input zone 130 to the output zone 147. Clip array 120 may include a plurality of movable first clips 124 that are slidably disposed on a first track 125 and a plurality of movable second clips 126 that are slidably disposed on a second track 127.

As disclosed further herein, polymer thin film 105 may include a single polymer layer or multiple (e.g., alternating) layers of first and second polymers, such as a multilayer ABAB . . . structure. Alternately, polymer thin film 105 may include a composite architecture having a polymer thin film (e.g., an optical quality polymer thin film) and a high Poisson's ratio polymer thin film directly overlying the polymer thin film (not separately shown). In some embodiments, a polymer thin film composite may include a high Poisson's ratio polymer thin film reversibly laminated to, or printed on, a single polymer thin film or a multilayer polymer thin film.

During operation, proximate to input zone 130, clips 124, 126 may be affixed to respective edge portions of polymer thin film 105, where adjacent clips located on a given track 125, 127 may be disposed at an inter-clip spacing 150. For simplicity, in the illustrated view, the inter-clip spacing 150 along the first track 125 within input zone 130 may be equivalent or substantially equivalent to the inter-clip spacing 150 along the second track 127 within input zone 130. As will be appreciated, in alternate embodiments, within input zone 130, the inter-clip spacing 150 along the first track 125 may be different than the inter-clip spacing 150 along the second track 127.

In addition to input zone 130 and output zone 147, system 100 may include one or more additional zones 135, 140, 145, etc., where each of: (i) the translation rate of the polymer thin film 105, (ii) the shape of first and second tracks 125, 127, (iii) the spacing between first and second tracks 125, 127, (iv) the inter-clip spacing 150, 152, 155, 157, 159, and (v) the local temperature of the polymer thin film 105, etc. may be independently controlled.

In an example process, as it is guided through system 100 by clips 124, 126, polymer thin film 105 may be heated to a selected temperature within each of zones 130, 135, 140, 145, 147. Fewer or a greater number of thermally controlled zones may be used. As illustrated, within zone 135, first and second tracks 125, 127 may diverge along a transverse direction such that polymer thin film 105 may be stretched in the transverse direction while being heated, for example, to a temperature greater than its glass transition temperature.

Referring still to FIG. 1, within zone 135 the spacing 152 between adjacent first clips 124 on first track 125 and the spacing 157 between adjacent second clips 126 on second track 127 may decrease relative to the inter-clip spacing 150 within input zone 130. In certain embodiments, the decrease in clip spacing 152, 157 from the initial spacing 150 may scale approximately as the square root of the transverse stretch ratio. The actual ratio may depend on the Poisson's ratio of the polymer thin film as well as the requirements for the stretched thin film, including flatness, thickness, crystalline content, etc.

In some embodiments, the temperature of the polymer thin film 105 may be decreased as the stretched polymer thin film 105 enters zone 140. Rapidly decreasing the temperature (i.e., thermal quenching) following the act of stretching within zone 135 may enhance the conformability of the polymer thin film 105. In some embodiments, the polymer thin film 105 may be thermally stabilized, where the temperature of the polymer thin film 105 may be controlled within each of the post-stretch zones 140, 145, 147. A temperature of the polymer thin film may be controlled by forced thermal convection or by radiation, for example, IR radiation, or a combination thereof.

Downstream of stretching zone 135, according to some embodiments, a transverse distance between first track 125 and second track 127 may remain constant or, as illustrated, initially decrease (e.g., within zone 140 and zone 145) prior to assuming a constant separation distance (e.g., within output zone 147). In a related vein, the inter-clip spacing downstream of stretching zone 135 may increase or decrease relative to inter-clip spacing 152 along first track 125 and inter-clip spacing 157 along second track 127. For example, inter-clip spacing 155 along first track 125 within output zone 147 may be less than inter-clip spacing 152 within stretching zone 135, and inter-clip spacing 159 along second track 127 within output zone 147 may be less than inter-clip spacing 157 within stretching zone 135. According to some embodiments, the spacing between the clips may be controlled by modifying the local velocity of the clips on a linear stepper motor line, or by using an attachment and variable clip-spacing mechanism connecting the clips to the corresponding track.

According to various embodiments, as a tensile stress is applied to the polymer thin film along the transverse direction, a dynamic inter-clip spacing within the stretching zone may allow the polymer film to relax along the machine direction. In some embodiments, thermal stabilization downstream of stretching zone 135 may include or exclude additional crystallization of the polymer thin film. By continuing to decrease the inter-clip spacing along the tracks downstream of stretching zone 135, e.g., within zone 140 and within zone 145, relaxation of the polymer thin film along the machine direction, e.g., during additional crystal growth, may allow a compressive stress to be imposed along the machine direction of the polymer thin film and an attendant realization of a preferred orientation, i.e., along the machine direction, of the newly-formed crystals.

In embodiments where the polymer thin film is laminated to a high Poisson's ratio polymer thin film, the high Poisson's ratio polymer thin film may impose an in-plane compressive strain on the polymer thin film along the machine direction. In such embodiments, by providing an induced strain along the machine direction, crystals within the polymer thin film may have a preferred orientation along both the transverse direction and the machine direction such that the crystals exhibit an anisotropic orientation resulting in an optically anisotropic polymer thin film 115 where $n_x > n_z \geq n_y$.

The strain impact of the thin film orientation system 100 is shown schematically with reference to unit segments 160, 165, which respectively illustrate pre-stretch dimensions and corresponding post-stretch dimensions for a selected area of polymer thin film 105. In the illustrated embodiment, polymer thin film 105 has a pre-stretch width (e.g., along the transverse direction) and a pre-stretch length (e.g., along the machine direction). As will be appreciated, a post-stretch width may be greater than the pre-stretch width and a post-stretch length may be less than the pre-stretch length. After stretching, a high Poisson's ratio polymer thin film may be separated (e.g., de-laminated) from the optically anisotropic polymer thin film.

As an alternative to the single-stage thin film orientation system 100 shown in FIG. 1, according to further embodiments, an optically anisotropic polymer thin film may be formed using a dual-stage system, which may be advantageously configured for continuous (e.g., roll-to-roll) operation. In a dual-stage system, a polymer thin film composite may be formed intermediate to a primary thin film orientation sub-system and a secondary thin film orientation sub-system. The primary thin film orientation sub-system may be used to form a stretched polymer thin film upon which a further polymer thin film is formed to create a composite polymer thin film. The secondary thin film orientation sub-system may then be used to stretch the composite to form an optically anisotropic polymer thin film.

Figure 2:
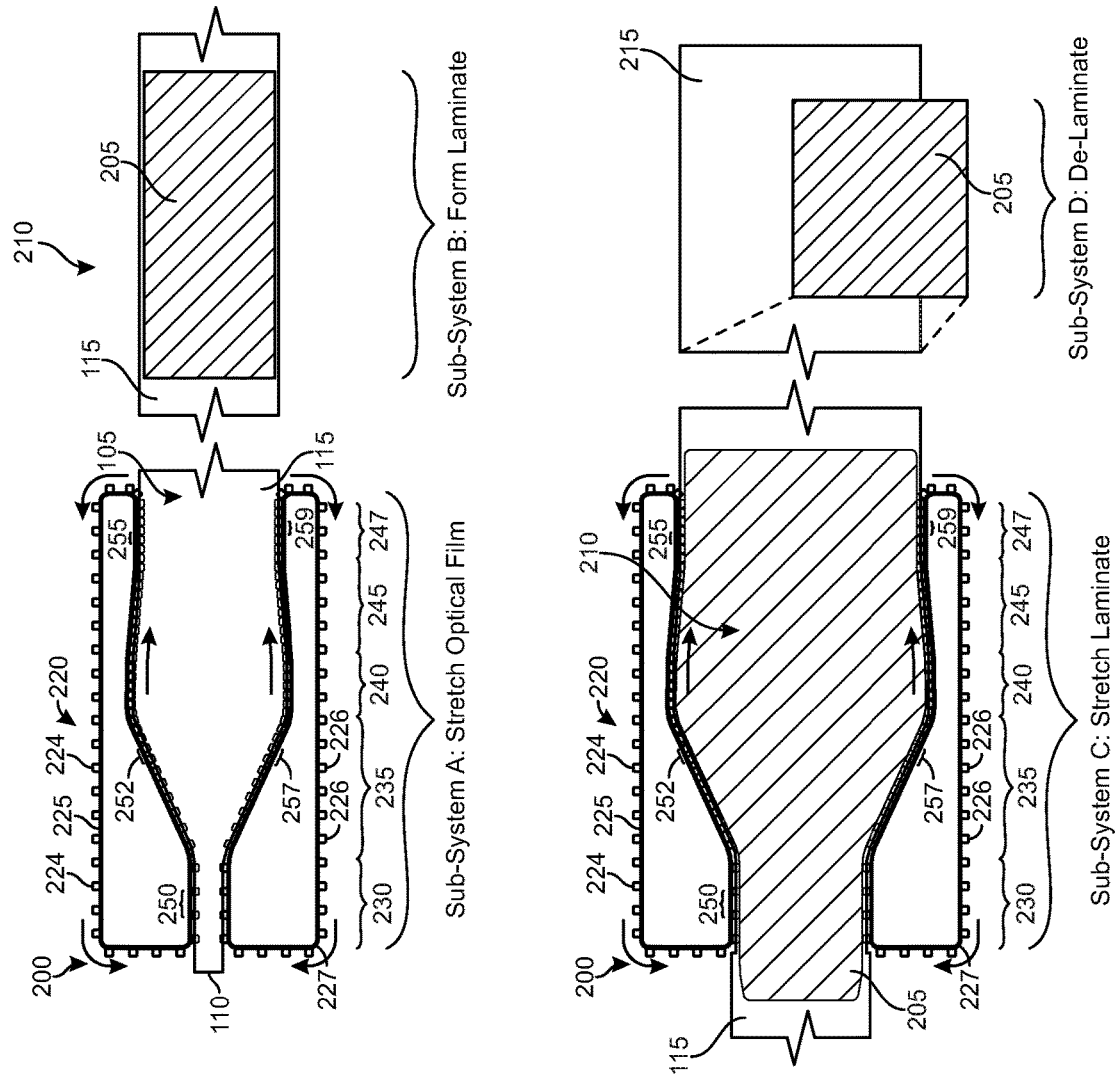
FIG. 2 is a top down plan view representation of a dual-stage thin film orientation system for manufacturing an optically anisotropic polymer thin film according to some embodiments.

An example dual-stage thin film orientation system is shown schematically in FIG. 2, where a polymer thin film may be processed using a primary thin film orientation sub-system (sub-system A) to form a stretched polymer thin film that is bonded to a high Poisson's ratio polymer thin film to form a polymer thin film composite (sub-system B). The composite may then be processed using a secondary thin film orientation sub-system (sub-system C). After stretching, the high Poisson's ratio polymer thin film may be separated (e.g., delaminated) from the optically anisotropic polymer thin film (sub-system D). As will be appreciated, the size and dimension of primary and secondary thin film orientation sub-systems may be readily adjusted to accommodate the dimensions of the polymer thin films to be processed. In some embodiments, the mode of operation of two or more thin film orientation sub-systems may be substantially equivalent.

Referring to thin film orientation sub-system 200 within sub-system A of FIG. 2, an example method may include attaching a first clip array 220 to opposing edges of a crystallizable portion 110 of a polymer thin film 105 within input zone 230. The first clip array 220 may include a plurality of first clips 224 slidably disposed on a first track 225 located proximate to a first edge of the polymer thin film 105, and a plurality of second clips 226 slidably disposed on a second track 227 located proximate to a second edge of the polymer thin film 105.

Within stretching zone 235, a positive in-plane strain may be applied to the polymer thin film 105 along a transverse direction by increasing a distance between the first clips 224 and the second clips 226. As disclosed also in conjunction with thin film orientation system 100 of FIG. 1, while applying a tensile stress in-plain, an inter-clip spacing 252 amongst the first clips 224 and an inter-clip spacing 257 amongst the second clips 226 may be decreased along a machine direction within stretching zone 235 relative to inter-clip spacing 250 within input zone 230 to form a stretched and oriented polymer thin film 115.

Within sub-system B, a high Poisson's ratio polymer thin film 205 may be formed directly over the stretched polymer thin film 115 to form a polymer thin film composite 210. With reference to thin film orientation sub-system 200 within sub-system C, the method may further include attaching a second clip array 220 to opposing edges of the polymer thin film composite 210. The second clip array may include a plurality of first clips 224 slidably disposed on a first track 225 located proximate to a first edge of the composite 210 and a plurality of second clips 226 slidably disposed on a second track 227 located proximate to a second edge of the composite 210.

Within deformation zone 235, a positive in-plane stress may be applied to the polymer thin film composite 210 along the transverse direction by increasing a distance between the first clips 224 and the second clips 226. Also within deformation zone 235, relative to inter-clip spacing 250 within input zone 230, an inter-clip spacing 252 amongst the first clips 224 and an inter-clip spacing 257 amongst the second clips 226 may decrease along the machine direction, which enables the high Poisson's ratio polymer thin film 205 to apply a negative in-plane strain to the stretched polymer thin film 115 along the machine direction and form an optically anisotropic polymer thin film 215. Following the act of stretching, the high Poisson's ratio polymer thin film 205 may be separated from the optically anisotropic polymer thin film 215 as shown in sub-system D.

In addition to input zone 230 and stretching zone 235, thin film orientation system 200 in sub-system A and thin film orientation system 200 in sub-system B may each include one or more additional zones 240, 245, 247 within which the temperature and the stress state of the polymer layer(s) being processed may be independently controlled. By way of example, the inter-clip spacing downstream of stretching zone 235 may increase or decrease relative to inter-clip spacing 252 along first track 225 and inter-clip spacing 257 along second track 227. For instance, within either or both of sub-system A and sub-system C, inter-clip spacing 255 along first track 225 within output zone 247 may be less than inter-clip spacing 252 within stretching zone 235, and inter-clip spacing 259 along second track 227 within output zone 247 may be less than inter-clip spacing 257 within stretching zone 235.

In a further example dual-stage thin film orientation system, a high Poisson's ratio polymer thin film may be initially processed through a primary thin film orientation sub-system to form a stretched high Poisson's ratio polymer thin film that is then bonded to a polymer thin film to form a polymer thin film composite. As in the previous embodiment, the polymer thin film composite may then be processed using a secondary thin film orientation sub-system to form an optically anisotropic polymer thin film. Such an example dual-stage thin film orientation system and its operation is described with reference to FIG. 3.

Figure 3:
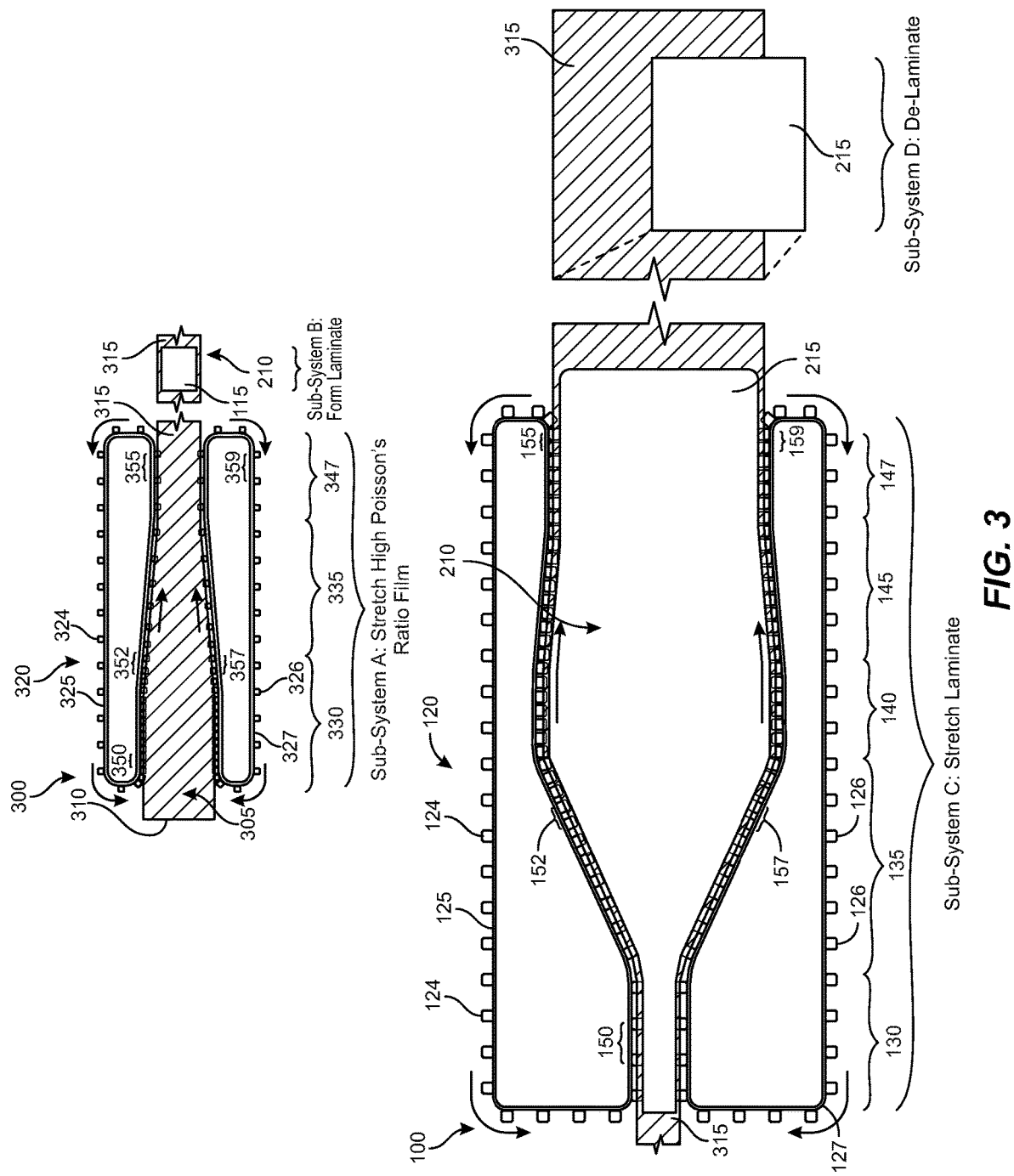
FIG. 3 is a top down schematic view of a dual-stage thin film orientation system for manufacturing an optically anisotropic polymer thin film according to further embodiments.

Referring to FIG. 3, a thin film orientation system may include a primary thin film orientation sub-system 300 for forming a high Poisson's ratio polymer thin film (sub-system A), an intermediate station (sub-system B) for forming a polymer thin film composite from the high Poisson's ratio polymer thin film output from sub-system A and an optical quality polymer thin film, a secondary thin film orientation sub-system 100 (sub-system C) for stretching the polymer thin film composite, and a delamination station (sub-system D) for separating an optically anisotropic optical quality polymer thin film from the high Poisson's ratio polymer thin film.

Primary sub-system 300 may include a thin film input zone 330 for receiving and pre-heating a crystallizable portion 310 of a polymer thin film 305, a thin film output zone 347 for outputting an at least partially crystallized and oriented portion 315 of the crystallizable polymer thin film 305, and a clip array 320 extending between the input zone 330 and the output zone 347 that is configured to grip and guide the polymer thin film 305 through the system 300. Clip array 320 may include a plurality of first clips 324 that are slidably disposed on a first track 325 and a plurality of second clips 326 that are slidably disposed on a second track 327. Sub-system A may be used to form a high Poisson's ratio polymer thin film 315.

In an example process, proximate to input zone 330, first and second clips 324, 326 may be affixed to edge portions of polymer thin film 305, where adjacent clips located on a given track 325, 327 may be disposed at an initial inter-clip spacing 350, which may be substantially constant or variable along both tracks within input zone 330.

The dynamics of system 300 allow independent control over: (i) the translation rate of the polymer thin film 305, (ii) the shape of first and second tracks 325, 327, (iii) the spacing between first and second tracks 325, 327 along the transverse direction, (iv) the inter-clip spacing 350 within input zone 330 as well as downstream of the input zone (e.g., inter-clip spacings 352, 355, 357, 359), and (v) the local temperature of the polymer thin film, etc.

In an example process, as it is guided through system 300 by clips 324, 326, polymer thin film 305 may be heated to a selected temperature within each of zones 330, 335, 347. A temperature greater than the glass transition temperature of a component of the polymer thin film 305 may be used during deformation (i.e., within zone 335), whereas a lesser temperature, an equivalent temperature, or a greater temperature may be used within each of one or more downstream zones.

Referring still to FIG. 3, within deformation zone 335, relative to inter-clip spacing 350 within input zone 330, an inter-clip spacing 352 amongst the first clips 324 and an inter-clip spacing 357 amongst the second clips 326 may increase along the machine direction, such that a positive in-plane stress is applied to the polymer thin film 305 along the machine direction. Moreover, as illustrated, within zone 335, first and second tracks 325, 327 may converge along the transverse direction such that the polymer thin film 305 may relax in the transverse direction while being stretched in the machine direction.

In some embodiments, the temperature of the polymer thin film 305 may be decreased as the stretched polymer thin film exits zone 335. In some embodiments, the crystallizable polymer thin film 305 may be thermally stabilized, where the temperature of the crystallizable polymer thin film 305 may be controlled within post-deformation zone 347. A temperature of the crystallizable polymer thin film may be controlled by forced thermal convection or by radiation, for example, IR radiation, or a combination thereof.

Downstream of deformation zone 335, the inter-clip spacing may increase, decrease, or remain substantially constant relative to inter-clip spacing 352 along first track 325 and inter-clip spacing 357 along second track 327. For example, inter-clip spacing 355 along first track 325 within output zone 347 may be substantially equal to or greater than the inter-clip spacing 352 as the clips exit zone 335, and inter-clip spacing 359 along second track 327 within output zone 347 may be substantially equal to or greater than the inter-clip spacing 357 as the clips exit zone 335.

Within sub-system B of FIG. 3, a polymer thin film 115 (e.g., an optical quality polymer thin film) may be formed directly over the high Poisson's ratio polymer thin film 315 to form a polymer thin film composite 210. Subsequently, polymer thin film composite 210 may be stretched within sub-system C of FIG. 3 to form an optically anisotropic polymer thin film 215 in the manner disclosed above with respect to the stretching of a polymer thin film composite within sub-system C of FIG. 2.

The dynamics of thin film orientation system 100 within sub-system C of FIG. 3 allow independent control over each of: (i) the local translation rate of the polymer thin film composite 210, (ii) the shape of first and second tracks 125, 127, (iii) the spacing between first and second tracks 125, 127, (iv) the inter-clip spacing 150, 152, 155, 157, 159, and (v) the local temperature of the composite 210. After stretching, within sub-system D, the optically anisotropic polymer thin film 215 may be separated (e.g., delaminated) from the high Poisson's ratio polymer thin film 315.

Figure 4:
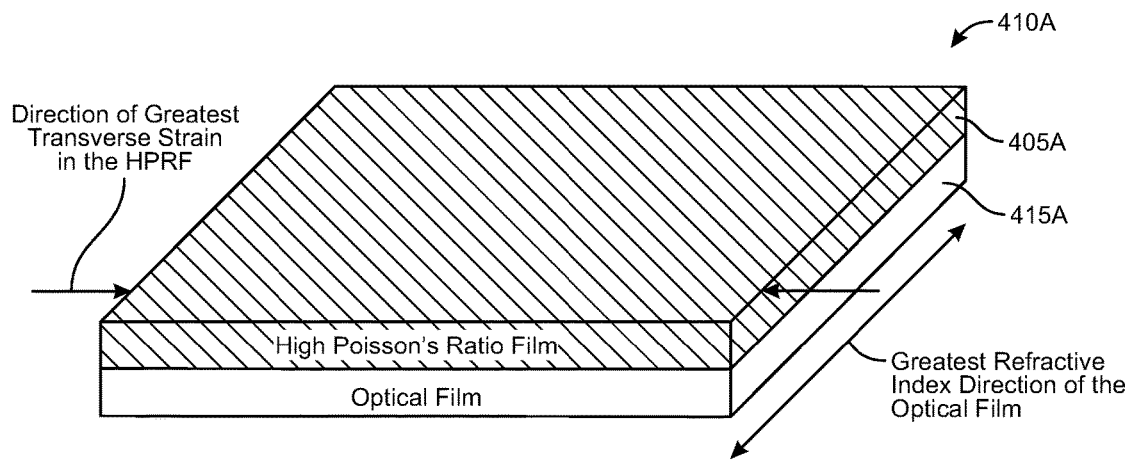
FIG. 4 is a perspective view showing example polymer thin film composites according to certain embodiments.
Figure 4:
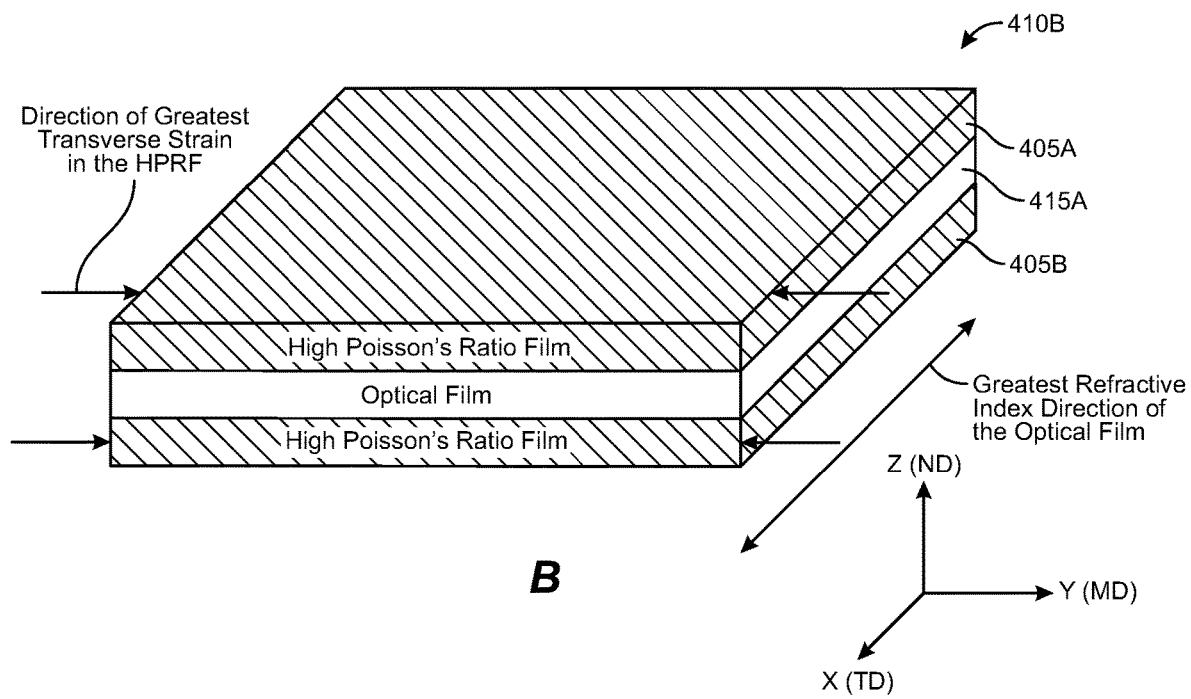
Figure 5:
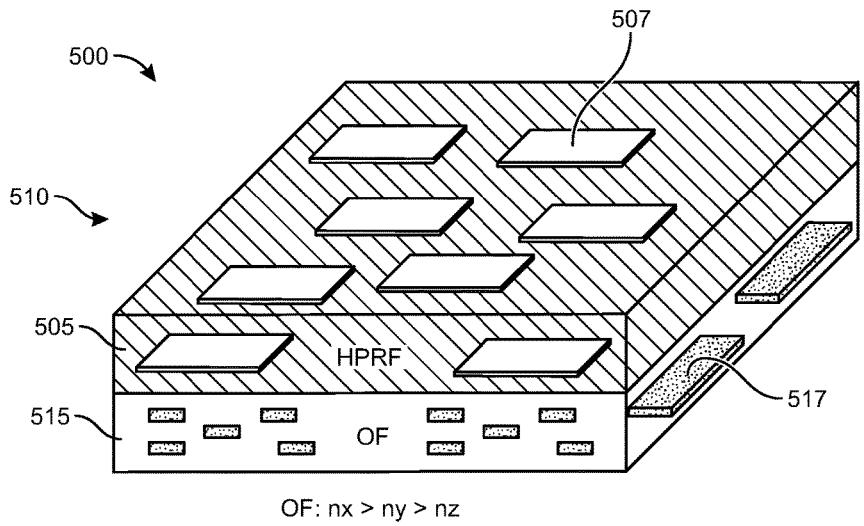
FIG. 5 illustrates the re-orientation of crystals within respective polymer layers of an example polymer thin film composite processed using a thin film orientation system according to some embodiments.
Figure 5:
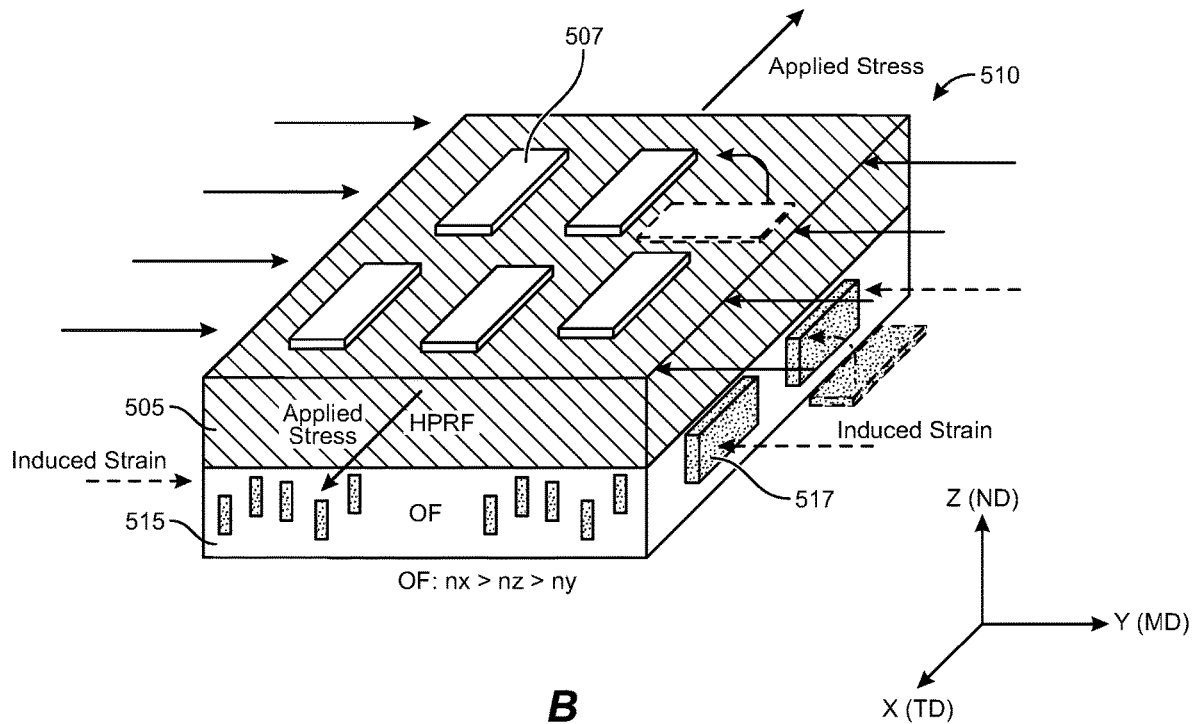

Referring to FIG. 4, in a polymer thin film composite (e.g., polymer thin film composite 210), a high Poisson's ratio polymer thin film may be disposed over one or both major surfaces of a crystallizable optical polymer thin film. In some embodiments, the polymer thin film composite may be formed by lamination or by direct printing. A laminate, for example, may be formed by adhesive bonding using a very high bond (VHB) adhesive tape or a pressure sensitive adhesive.

As illustrated in FIG. 4A, a polymer thin film composite 410A may include a crystalline or crystallizable optical polymer thin film 415A and a high Poisson's ratio polymer thin film 405A disposed over one major surface of the crystalline or crystallizable optical polymer thin film 415A. Referring to FIG. 4B, a polymer thin film composite 410B may include a crystalline or crystallizable optical polymer thin film 415A and a pair of high Poisson's ratio polymer thin films 405A, 405B respectively disposed over each major surface of the crystalline or crystallizable optical polymer thin film 415A. Following processing (i.e., stretching) of the polymer thin film composite, the high Poisson's ratio polymer thin film(s) may be de-bonded from the optical polymer thin film by applying different shear strains to the different layers of the composite, exposure to UV radiation and/or by increasing or decreasing the temperature of the composite.

As disclosed herein, a polymer thin film may be laminated to a sacrificial high Poisson's ratio polymer thin film where the anisotropic mechanical properties of the latter may be used to deform (i.e., compress) the polymer thin film along at least one direction. In some embodiments, during the act of deformation, crystallites within the polymer thin film may be reoriented, which may result in the polymer thin film exhibiting a high degree of optical anisotropy.

In particular embodiments, in response to a state of uniaxially-applied tension, the high Poisson's ratio polymer thin film may induce in the polymer thin film an in-plane compressive strain orthogonal to the applied stress, i.e., where the compressive strain in the composite is greater than that of the polymer thin film. Such a compressive strain may cause a reorientation of crystallites or polymer chains in the polymer thin film and the realization of greater in-plane birefringence. This response is shown schematically in FIG. 5.

Referring to FIG. 5A, a method 500 may include forming a composite 510 that includes a high Poisson's ratio polymer thin film 505 bonded to a crystallizable, optical polymer thin film 515. In some embodiments, the high Poisson's ratio polymer thin film 505 and the optical polymer thin film 515 may be formed simultaneously or in succession.

In the as-formed composite 510, the Poisson's ratio of the high Poisson's ratio polymer thin film 505 may be greater than the Poisson's ratio of the optical polymer thin film 515, e.g., approximately 10% greater, approximately 20% greater, approximately 50% greater, approximately 100% greater, or approximately 150% greater or more, including ranges between any of the foregoing values.

Referring to FIG. 5B, by applying a uniaxial stress to the composite 510, e.g., along the x-axis, the attendant transverse contraction in the high Poisson's ratio polymer thin film 505 along the y-axis may cause crystallites 507 in the high Poisson's ratio polymer thin film 505 to rotate in the plane of the thin film 505 and induce a dimensional change and crystallite realignment in the adjacent optical polymer thin film 515. In examples where the Poisson's ratio of the optical polymer thin film 515 is less than the Poisson's ratio of the high Poisson's ratio polymer thin film 505, the strain induced within the optical polymer thin film 515 may create lateral compression in the optical polymer thin film 515, a rotation of crystallites 517 within the optical polymer thin film 515 out of the plane of the optical polymer thin film 515 and the creation of anomalous birefringence. For instance, the extent of an out-of-plane rotation of crystallites 517 within optical polymer thin film 515 may range from approximately 10° to approximately 90°, e.g., approximately 10°, approximately 20°, approximately 30°, approximately 40°, approximately 45°, approximately 50°, approximately 60°, approximately 70°, approximately 80°, or approximately 90°, including ranges between any of the foregoing values. In some embodiments, the composite 510 may be heated during the act of stretching and crystallite realignment.

Such re-orientation of the crystalline phase within the polymer thin film 515 may increase the refractive index along the z-axis, i.e., along the thickness dimension of the optical polymer thin film 515, decrease the refractive index along the y-axis, and create an optical polymer thin film where $n_x > n_z > n_y$. Although not illustrated, after stretching, the optical polymer thin film 515 may be de-bonded or otherwise separated from the high Poisson's ratio polymer thin film 505.

As disclosed herein, as single layers or multilayer stacks, optically anisotropic polymer thin films may be incorporated into a variety of optical elements, such as birefringent gratings, optical retarders, optical compensators, reflective polarizers, and the like. The efficiency of these and other optical elements may depend on the degree of in-plane birefringence exhibited by the polymer thin film(s).

A polymer thin film may be characterized by in-plane refractive indices ($n_x$ and $n_y$) and a through-thickness refractive index (ni). Applicants have demonstrated that the deformation of a semi-crystalline or crystalline polymer thin film and the attendant strain-induced realignment of crystals within the polymer can generate anisotropic, optically birefringent materials where $n_x > n_z > n_y$. In certain embodiments, $n_x > 1.8$ and the in-plane birefringence ($n_x - n_y$) may be greater than 0.15. Example polymer compositions may include polyethylene naphthalate (PEN) or polyethylene terephthalate (PET), although further polymer compositions are contemplated.

In accordance with various embodiments, an optically anisotropic polymer thin film may be formed from a polymer thin film that is incorporated into a composite and processed using a thin film orientation system that is configured to heat and stretch the composite. The composite may include a polymer thin film and a high Poisson's ratio polymer thin film directly overlying the polymer thin film. The thin film orientation system may be configured to apply an in-plane tensile stress to the composite along one in-plane direction such that an in situ compressive stress resulting from deformation of the high Poisson's ratio polymer thin film is applied to the polymer thin film along an orthogonal in-plane direction.

In particular embodiments, a polymer thin film laminate may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, an inter-clip spacing along either or both tracks may vary as a function of location within the thin film orientation system. Such a dynamic configuration may be used to effectively decrease the translation velocity of the polymer thin film along the machine direction, which may allow the application of a compressive stress along the machine direction and the attendant realignment of crystals.

EXAMPLE EMBODIMENTS

Example 1: A method includes forming a composite thin film having a polymer thin film and a high Poisson's ratio polymer thin film disposed directly over the polymer thin film, attaching a clip array to opposing edges of the composite thin film, the clip array including a plurality of first clips slidably disposed on a first track located proximate to a first edge of the composite thin film and a plurality of second clips slidably disposed on a second track located proximate to a second edge of the composite thin film, applying a positive in-plane strain to the composite thin film along a transverse direction by increasing a distance between the first clips and the second clips, and decreasing an inter-clip spacing amongst the first clips and amongst the second clips along a machine direction, where the high Poisson's ratio polymer thin film applies a negative in-plane strain to the polymer thin film along the machine direction to form an optically anisotropic polymer thin film.

Example 2: The method of Example 1, where the composite thin film is formed by laminating the high Poisson's ratio polymer thin film over a major surface of the polymer thin film.

Example 3: The method of any of Examples 1 and 2, where the high Poisson's ratio polymer thin film applies the negative in-plane strain along the machine direction while the positive in-plane strain is applied along the transverse direction.

Example 4: The method of any of Examples 1-3, where the polymer thin film includes a polymer selected from polyethylene naphthalate, polyethylene terephthalate, polybutylene naphthalate, and polybutylene terephthalate.

Example 5: The method of any of Examples 1-4, further including heating the composite thin film to a temperature greater than a glass transition temperature of at least one component of the polymer thin film while applying the positive in-plane strain.

Example 6: The method of any of Examples 1-5, where a translation rate of the first and second clips along the machine direction decreases while applying the positive in-plane strain.

Example 7: The method of any of Examples 1-6, where the decrease in the inter-clip spacing is proportional to the spacing increase between the first clips and the second clips.

Example 8: The method of any of Examples 1-7, further including heating the composite thin film to a temperature greater than a glass transition temperature of at least one component of the polymer thin film after applying the positive in-plane strain.

Example 9: The method of any of Examples 1-8, wherein the polymer thin film is an optical quality polymer thin film.

Example 10: The method of any of Examples 1-9, further including separating the high Poisson's ratio polymer thin film from the optically anisotropic polymer thin film.

Example 11: The method of any of Examples 1-10, where a crystalline content of the polymer thin film increases while applying the positive in-plane strain.

Example 12: The method of any of Examples 1-11, where the optically anisotropic polymer thin film includes at least approximately 1 volume percent of a crystalline phase.

Example 13: The method of any of Examples 1-12, where the composite thin film has a thickness of approximately 1 micrometer to approximately 400 micrometers.

Example 14: The method of any of Examples 1-13, where the optically anisotropic polymer thin film is characterized by: (a) a first in-plane refractive index ($n_x$) along the transverse direction, (b) a second in-plane refractive index ($n_y$) along the machine direction; (c) and a third refractive index ($n_z$) along a thickness direction substantially orthogonal to both the transverse direction and the machine direction, where $n_x > n_z \geq n_y$.

Example 15: The method of Example 14, where $n_x$ is greater than approximately 1.8.

Example 16: The method of any of Examples 14 and 15, where $(n_x-n_y)$ is greater than 0.15.

Example 17: A method includes attaching a first clip array to opposing edges of a polymer thin film, the first clip array including a plurality of first clips slidably disposed on a first track located proximate to a first edge of the polymer thin film and a plurality of second clips slidably disposed on a second track located proximate to a second edge of the polymer thin film, applying a positive in-plane strain to the polymer thin film along a transverse direction by increasing a distance between the first clips and the second clips, decreasing an inter-clip spacing amongst the first clips and amongst the second clips along a machine direction while applying the positive in-plane strain to form a stretched polymer thin film, forming a composite polymer thin film by forming a high Poisson's ratio polymer thin film directly over the stretched polymer thin film, attaching a second clip array to opposing edges of the composite polymer thin film, the second clip array including a plurality of third clips slidably disposed on a third track located proximate to a first edge of the composite polymer thin film and a plurality of fourth clips slidably disposed on a fourth track located proximate to a second edge of the composite polymer thin film, applying a positive in-plane strain to the composite polymer thin film along the transverse direction by increasing a distance between the third clips and the fourth clips, and decreasing an inter-clip spacing amongst the third clips and amongst the fourth clips along the machine direction, where the high Poisson's ratio polymer thin film applies a negative in-plane strain to the stretched polymer thin film along the machine direction to form an optically anisotropic polymer thin film.

Example 18: The method of Example 17, further including separating the high Poisson's ratio polymer thin film from the optically anisotropic polymer thin film.

Example 19: A method includes attaching a first clip array to opposing edges of a polymer thin film, the first clip array including a plurality of first clips slidably disposed on a first track located proximate to a first edge of the polymer thin film and a plurality of second clips slidably disposed on a second track located proximate to a second edge of the polymer thin film, applying a positive in-plane strain to the polymer thin film along a machine direction by increasing an inter-clip spacing amongst the first clips and amongst the second clips, decreasing a distance between the first clips and the second clips along a transverse direction while applying the positive in-plane strain to form a high Poisson's ratio polymer thin film, forming a composite polymer thin film by forming an optical quality polymer thin film directly over the high Poisson's ratio polymer thin film, attaching a second clip array to opposing edges of the composite polymer thin film, the second clip array including a plurality of third clips slidably disposed on a third track located proximate to a first edge of the composite polymer thin film and a plurality of fourth clips slidably disposed on a fourth track located proximate to a second edge of the composite polymer thin film, applying a positive in-plane strain to the composite polymer thin film along the transverse direction by increasing a distance between the third clips and the fourth clips, and decreasing an inter-clip spacing amongst the third clips and amongst the fourth clips along the machine direction, where the high Poisson's ratio polymer thin film applies a negative in-plane strain to the optical quality polymer thin film along the machine direction to form an optically anisotropic optical quality polymer thin film.

Example 20: The method of Example 19, further including separating the high Poisson's ratio polymer thin film from the optically anisotropic optical quality polymer thin film.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 600 in FIG. 6) or that visually immerses a user in an artificial reality (e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
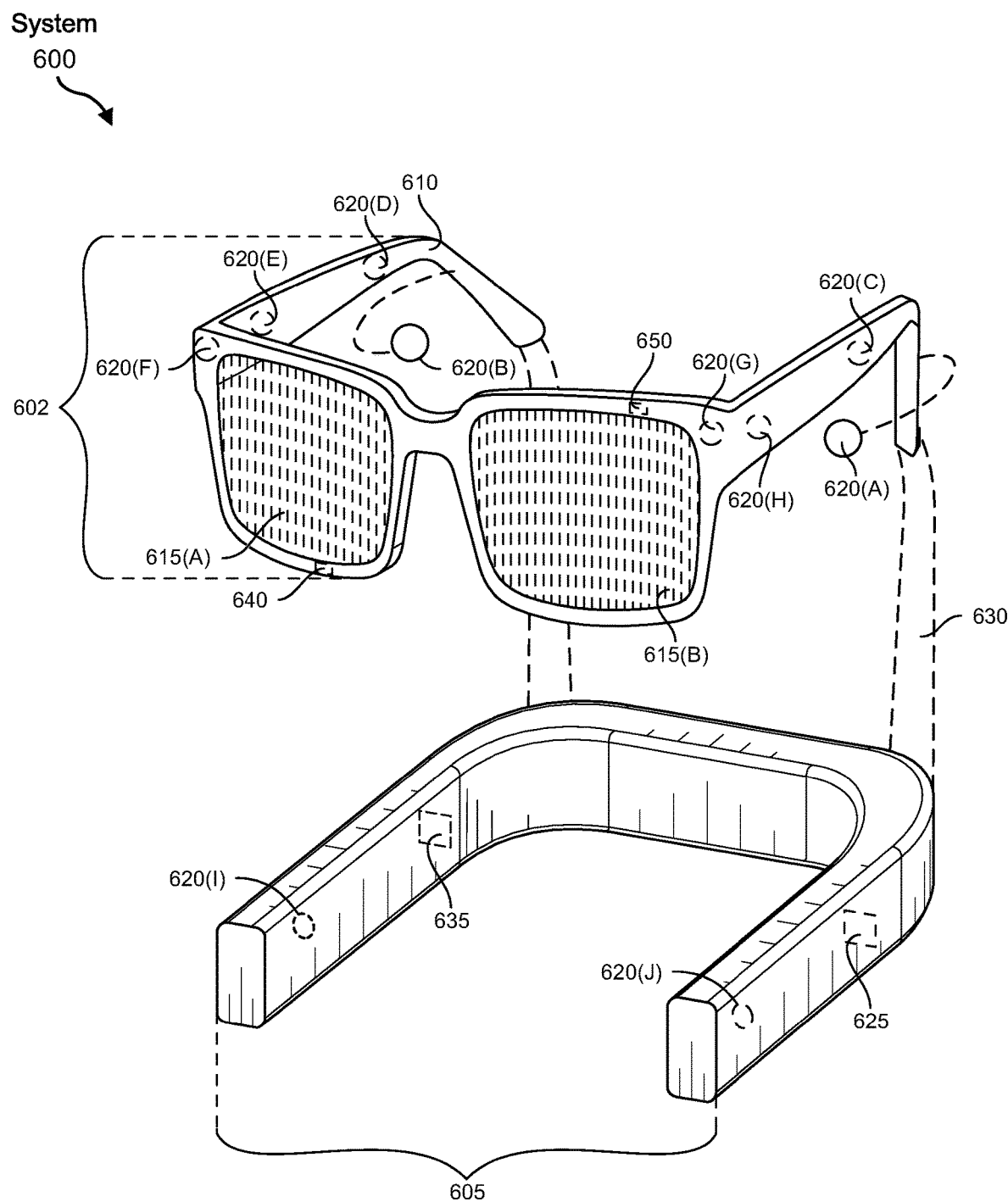
FIG. 6 is an illustration of exemplary augmented-reality glasses that may be used in connection with embodiments of this disclosure.
Figure 7:
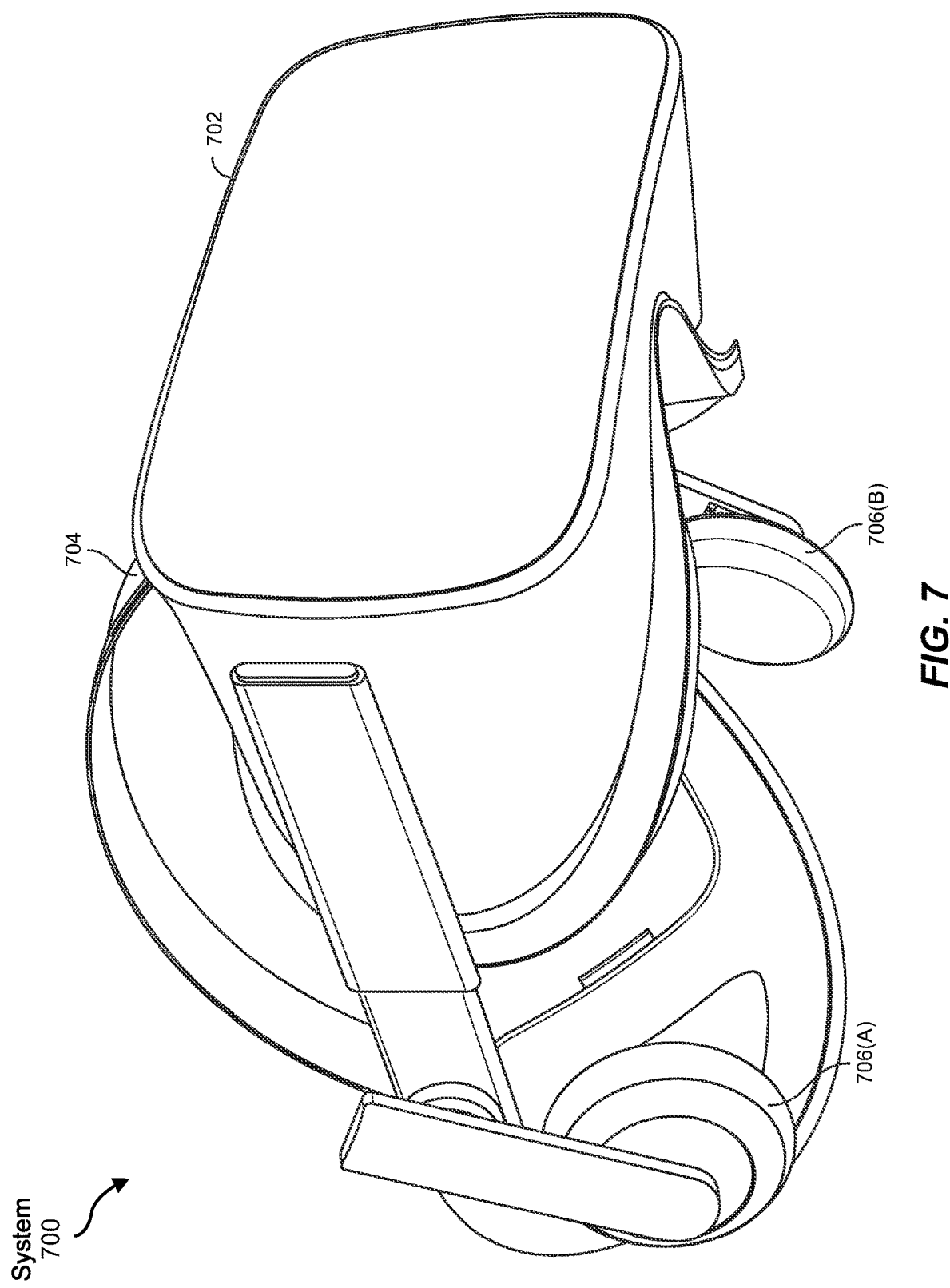
FIG. 7 is an illustration of an exemplary virtual-reality headset that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

Augmented-reality system 600 may also include a microphone array with a plurality of acoustic transducers 620(A)-620(J), referred to collectively as acoustic transducers 620. Acoustic transducers 620 may be transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620(G), and 620(H), which may be positioned at various locations on frame 610, and/or acoustic transducers 620(I) and 620(J), which may be positioned on a corresponding neckband 605.

In some embodiments, one or more of acoustic transducers 620(A)-(F) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality device 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a Bluetooth connection). In still other embodiments, acoustic transducers 620(A) and 620(B) may not be used at all in conjunction with augmented-reality system 600.

Acoustic transducers 620 on frame 610 may be positioned along the length of the temples, across the bridge, above or below display devices 615(A) and 615(B), or some combination thereof. Acoustic transducers 620 may be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(I) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620 (D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 7, output audio transducers 706(A) and 706(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 6, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a polymer thin film that comprises or includes polyethylene naphthalate include embodiments where a polymer thin film consists essentially of polyethylene naphthalate and embodiments where a polymer thin film consists of polyethylene naphthalate.

What is claimed is:

1. A method comprising:
   forming a composite thin film comprising a polymer thin film and a high Poisson's ratio polymer thin film disposed directly over the polymer thin film;
   attaching a clip array to opposing edges of the composite thin film, the clip array comprising a plurality of first clips slidably disposed on a first track located proximate to a first edge of the composite thin film and a plurality of second clips slidably disposed on a second track located proximate to a second edge of the composite thin film;
   applying a positive in-plane strain to the composite thin film along a transverse direction by increasing a distance between the first clips and the second clips; and
   decreasing an inter-clip spacing amongst the first clips and amongst the second clips along a machine direction, wherein a translation rate of the first and second clips along the machine direction decreases while applying the positive in-plane strain and the high Poisson's ratio polymer thin film applies a negative in-plane strain to the polymer thin film along the machine direction to form an optically anisotropic polymer thin film.

2. The method of claim 1, wherein the composite thin film is formed by laminating the high Poisson's ratio polymer thin film over a major surface of the polymer thin film.

3. The method of claim 1, wherein the high Poisson's ratio polymer thin film applies the negative in-plane strain along the machine direction while the positive in-plane strain is applied along the transverse direction.

4. The method of claim 1, wherein the polymer thin film comprises a polymer selected from the group consisting of polyethylene naphthalate, polyethylene terephthalate, polybutylene naphthalate, and polybutylene terephthalate.

5. The method of claim 1, further comprising heating the composite thin film to a temperature greater than a glass transition temperature of at least one component of the polymer thin film while applying the positive in-plane strain.

6. The method of claim 1, wherein the decrease in the inter-clip spacing is proportional to the spacing increase between the first clips and the second clips.

7. The method of claim 1, further comprising heating the composite thin film to a temperature greater than a glass transition temperature of at least one component of the polymer thin film after applying the positive in-plane strain.

8. The method of claim 1, wherein the polymer thin film comprises an optical quality polymer thin film.

9. The method of claim 1, further comprising separating the high Poisson's ratio polymer thin film from the optically anisotropic polymer thin film.

10. The method of claim 1, wherein a crystalline content of the polymer thin film increases while applying the positive in-plane strain.

11. The method of claim 1, wherein the optically anisotropic polymer thin film comprises at least approximately 1 volume percent of a crystalline phase.

12. The method of claim 1, wherein the composite thin film has a thickness of approximately 1 micrometer to approximately 400 micrometers.

13. The method of claim 1, wherein the optically anisotropic polymer thin film is characterized by:
- a first in-plane refractive index ($n_x$) along the transverse direction;
- a second in-plane refractive index ($n_y$) along the machine direction; and
- a third refractive index ($n_z$) along a thickness direction substantially orthogonal to both the transverse direction and the machine direction, wherein $n_x > n_z \geq n_y$.

14. The method of claim 13, wherein $n_x$ is greater than approximately 1.80.

15. The method of claim 13, wherein ($n_x - n_y$) is greater than 0.15.

16. A method comprising:
- forming a composite thin film comprising a polymer thin film and a high Poisson's ratio polymer thin film disposed directly over the polymer thin film;
- attaching a clip array to opposing edges of the composite thin film, the clip array comprising a plurality of first clips slidably disposed on a first track located proximate to a first edge of the composite thin film and a plurality of second clips slidably disposed on a second track located proximate to a second edge of the composite thin film,
- applying a positive in-plane strain to the composite thin film along a transverse direction by increasing a distance between the first clips and the second clips;
- heating the composite thin film to a temperature greater than a glass transition temperature of at least one component of the polymer thin film after applying the positive in-plane strain; and
- decreasing an inter-clip spacing amongst the first clips and amongst the second clips along a machine direction, wherein the high Poisson's ratio polymer thin film applies a negative in-plane strain to the polymer thin film along the machine direction to form an optically anisotropic polymer thin film.

17. A method comprising:
- forming a composite thin film comprising a polymer thin film and a high Poisson's ratio polymer thin film disposed directly over the polymer thin film;
- attaching a clip array to opposing edges of the composite thin film, the clip array comprising a plurality of first clips slidably disposed on a first track located proximate to a first edge of the composite thin film and a plurality of second clips slidably disposed on a second track located proximate to a second edge of the composite thin film;
- applying a positive in-plane strain to the composite thin film along a transverse direction by increasing a distance between the first clips and the second clips;
- decreasing an inter-clip spacing amongst the first clips and amongst the second clips along a machine direction, wherein the high Poisson's ratio polymer thin film applies a negative in-plane strain to the polymer thin film along the machine direction to form an optically anisotropic polymer thin film; and
- separating the high Poisson's ratio polymer thin film from the optically anisotropic polymer thin film.

* * * * *